(12) United States Patent
Deom et al.

(10) Patent No.: US 8,678,602 B2
(45) Date of Patent: Mar. 25, 2014

(54) CANTILEVER INDICATOR FOR VEHICLE INSTRUMENT CLUSTER

(75) Inventors: David Pineda Deom, Tlajomulco de Zuñiga (MX); Nohemi Bravo, Tlaquepaque (MX); Cesar Ascencion Buenrostro, Tlaquepaque (MX); Sallvador Montero Montes de Oca, Zapopan (MX); Luis Ernesto Quiroz de la Mora, Guadalajara (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 261 days.

(21) Appl. No.: 13/348,124

(22) Filed: Jan. 11, 2012

(65) Prior Publication Data

US 2013/0176706 A1 Jul. 11, 2013

(51) Int. Cl.
*F21V 33/00* (2006.01)
*G12B 11/00* (2006.01)

(52) U.S. Cl.
USPC .................. 362/23.07; 362/23.16; 362/23.17; 362/23.01; 116/286

(58) Field of Classification Search
USPC .......... 362/23.01, 23.07–23.13, 23.16, 23.17, 362/23.14, 612, 602–605, 555; 116/48, 49, 116/286, 310
See application file for complete search history.

(56) References Cited

U.S. PATENT DOCUMENTS

| 7,077,535 B2 * | 7/2006 | Wu ................................ 362/26 |
| 7,121,674 B2 * | 10/2006 | Kraus et al. ..................... 362/27 |
| 7,575,331 B2 * | 8/2009 | Birman et al. .................. 362/27 |

* cited by examiner

*Primary Examiner* — Bao Q Truong

(57) ABSTRACT

An instrument panel assembly for a vehicle includes a main gauge that defines a main display area and a plurality of cantilevered light guides that are supported on the main gauge and extend outwardly from the main gauge. Each of the light guides are formed from a clear material providing visibility through each of the light guides. A corresponding plurality of lights selectively illuminates each of the plurality of cantilevered light guides. An etched surface is formed on the surface of each of the cantilevered light guides in the shape of a numeral or symbol. The illumination of the etched area on the clear cantilevered light guide creates the appearance that the symbols or numerals are floating proximate the main gauge and thereby generate desired aesthetic features while communicating information to a vehicle operator.

20 Claims, 3 Drawing Sheets

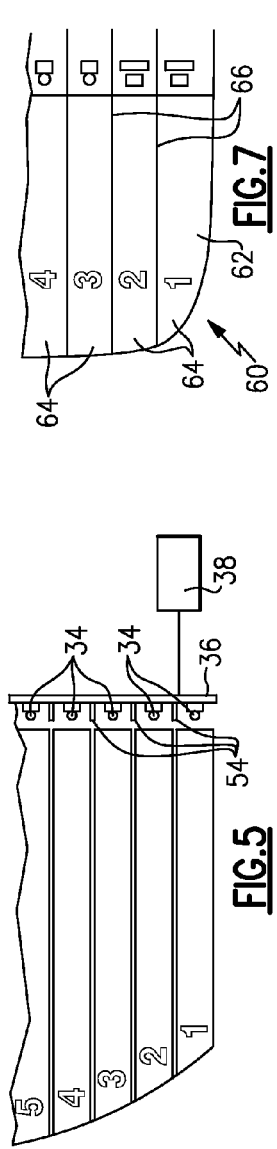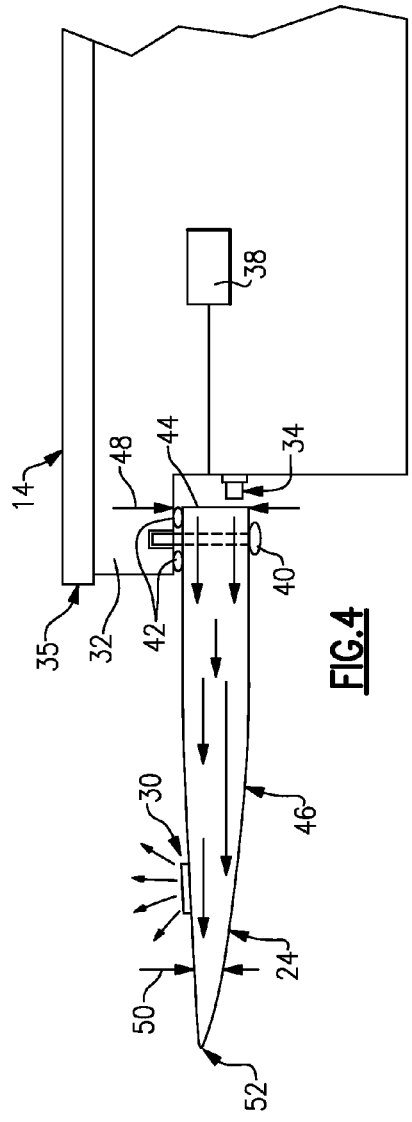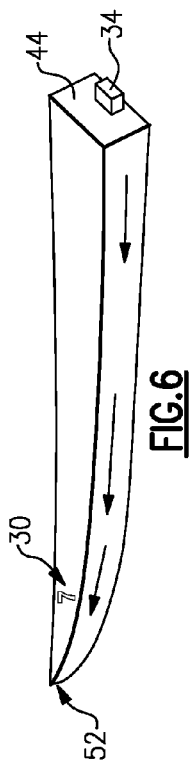

CANTILEVER INDICATOR FOR VEHICLE INSTRUMENT CLUSTER

BACKGROUND

This disclosure generally relates to a lighted indicator for a vehicle instrument cluster. More particularly, this disclosure relates to a plurality of cantilevered light guides that extend from a vehicle instrument cluster for communicating a vehicle operating parameter.

Vehicles include instrument clusters and gauges for communicating desired operating parameters such as vehicle speed, engine rpm and direction indicators. Many different methods and devices are known for communicating this information. Each method and device provides not only the function of communicating operating information to a driver, but also form and contribute to the style and aesthetic appearance of a vehicle interior. Accordingly, it is desirable to develop new and unique devices and methods for communicating and representing vehicle operating information to contribute to a desired appearance.

SUMMARY

A disclosed instrument panel assembly for a vehicle includes a main gauge that defines a main display area and a plurality of cantilevered light guides that are supported on the main gauge and extend outwardly from the main gauge. Each of the light guides are formed from a clear material providing visibility through each of the light guides. A corresponding plurality of lights selectively illuminates each of the plurality of light guides. An etched surface is formed on the surface of each of the light guides in the shape of a numeral or symbol. The etched surface is spaced apart from the main gauge and accumulates light to highlight the symbol or numeral to communicate the desired vehicle parameter. The illumination of the etched area on the clear light guides creates the appearance that the symbols or numerals are floating proximate the main gauge and thereby generate the desired aesthetic features while communicating information to a vehicle operator.

These and other features disclosed herein are best understood from the following specification and drawings, the following of which is a brief description.

BRIEF DESCRIPTION OF THE DRAWINGS

FIG. 4 is a cross sectional view of the example the indicator for the instrument panel.

FIG. 5 is a schematic view of a portion of an example indicator.

FIG. 6 is a perspective view of an example light guide of the indicator.

FIG. 7 is a schematic representation of another indicator for a vehicle instrument panel.

DETAILED DESCRIPTION

Figure 1:
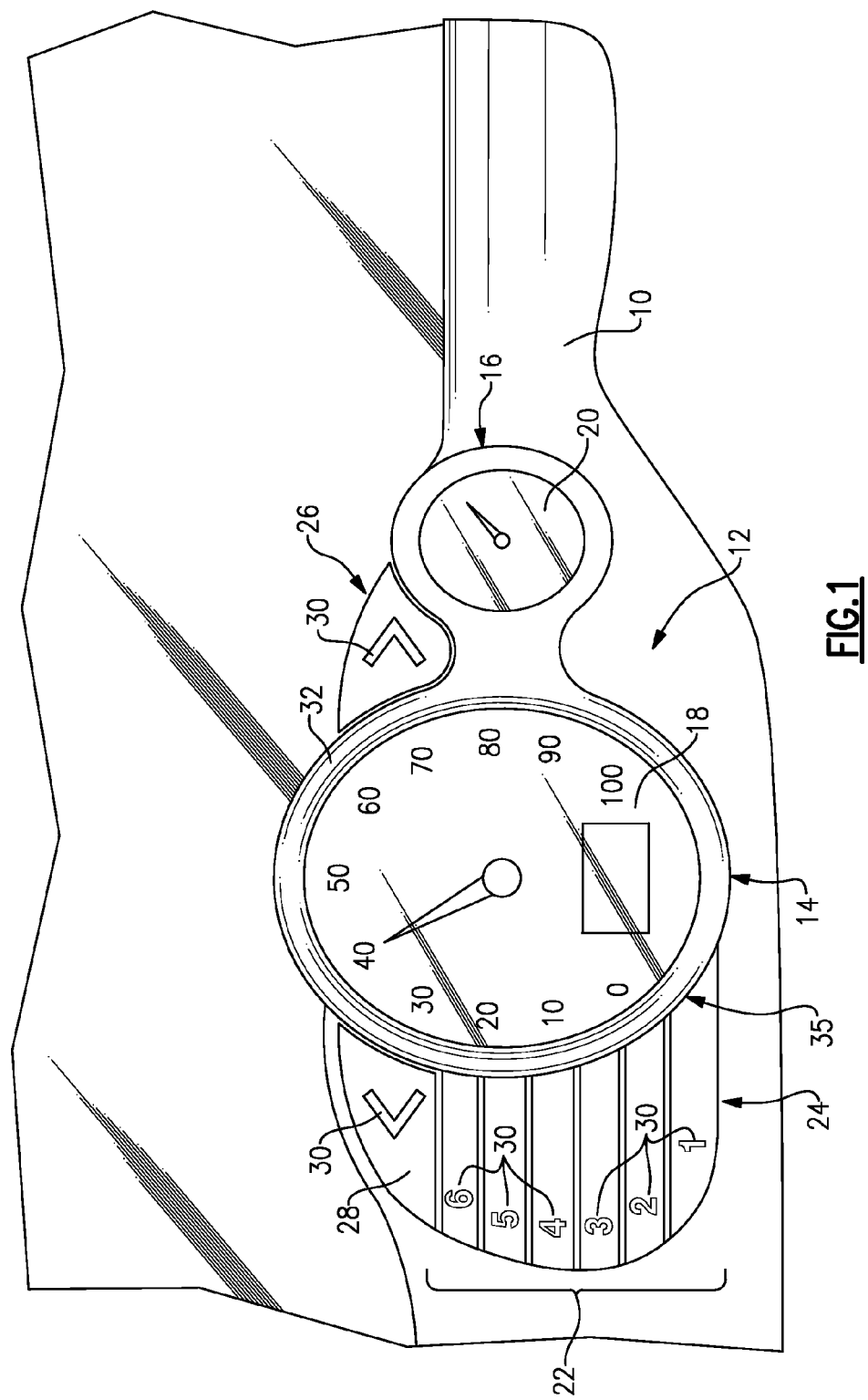
FIG. 1 is a front view of an example vehicle instrument panel.

Referring to FIG. 1, a vehicle dashboard 10 includes an instrument panel 12 including a main gauge 14 and a secondary gauge 16. The main gauge 14 includes a face 18 on which is a scale for providing and communicating information indicative of a vehicle operating parameter. The secondary gauge 16 includes a secondary face 20 that provides information on another vehicle operating parameter. In the illustrated example, the main gauge 14 provides an indication of vehicle speed. A pointer rotates about a central point and points to a numeral that is indicative of the current vehicle operating speed. The secondary gauge 20 includes another pointer that will rotate about a central axis to point to a specific parameter defined on the secondary face 20. It should be understood that the information communicated through the main gauge 14 and the secondary gauge 16 can be of any type and configuration as is understood by a worker skilled in the art. Moreover, although each of the example gauges are shown as including pointers, an entirely digital display without a pointer is also within the contemplation of this disclosure.

Mounted to a housing 32 of the main and secondary gauges 14, 16 is an information display device in the form of indicator 22. The example indicator 22 includes a plurality of individual light guides 24 that extend from a periphery 35 of the housing 32. Each of the individual light guides 24 comprise a bar or beam that extends from the periphery 35 of the housing 32 outwardly in a cantilevered fashion away from the main gauge 14. The example indicator assembly provides and communicates engine RPM. Selective lighting of each of the individual cantilevered light guides 24 communicates engine RPM to a vehicle operator.

Mounted to the housing 32 is a left hand turn signal 28. A corresponding right hand turn signal 26 is mounted on the right side of the housing 32. Each of the right and left turn signals 26, 28 are light guides of the indicator 22 and are mounted to and extend outwardly from the periphery 35 of the housing 32.

Each of the light guides 24 and the turn signals 26, 28 include an etched portion 30. The etched portions 30 accumulate light input into each of the corresponding light guides. Selective illumination of a light source corresponding to each of the light guides 24 directs light through the corresponding light guide 24 for illuminating the numerals etched into the surface. The visual effect provided by such illumination is that of the numbers floating separately and spaced apart from the periphery 35 of the main gauge 32.

Each of the light guides and the turn signal indicators 26, 28 are clear material allowing and operator to view behind and through the indicator 22 when in a non-illuminative or in illuminative condition. When a specific light guide is illuminated the etched portion 30 forming the numeral or symbol becomes illuminated and especially visible to the vehicle operator. This creates the appearance that the numbers and symbols are floating in a space that is a distance from the main gauge 14. Moreover, in a non-illuminated condition, the etched portions are substantially not visible or are very subdued such that upon illumination the etched portions 30 provide the appearance of appearing out of nowhere.

As appreciated, as each of the individual light guides 24 is illuminated the lighting comes from a side portion that is mounted to the housing 32. This light travels through the light guides 24 and is accumulated at the etched portions that form the numerals or symbols that communicate information to a vehicle operator.

Figure 3:
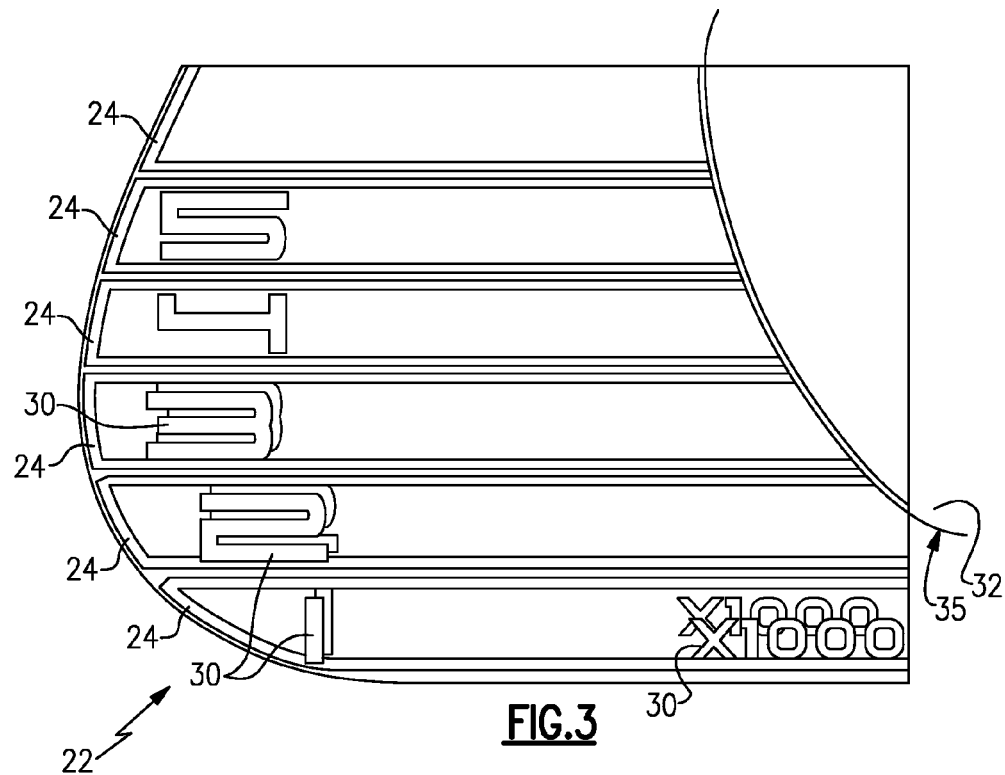
FIG. 3 is an enlarged view of the example an indicator for an instrument panel in a partially lighted condition.
Figure 2:
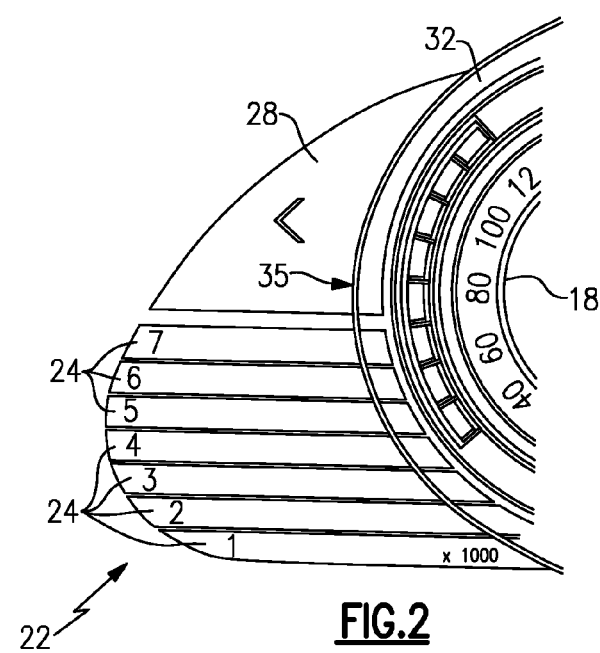
FIG. 2 is an enlarged view of a portion of an example instrument panel.

Referring to FIGS. 2 and 3, the indicator 22 extends from the outer periphery 35 of the housing 32 of the main gauge 14 and includes a curved external shape or surface. This surface is illustrated in a specific curved manner that corresponds with an outline of the periphery 35 of the main gauge housing 32. However, the indicator 22 may be configured to provide any shape as desired to compliment the main gauge 14 and create or match the desired aesthetic appearance of the dashboard 10.

FIG. 3 illustrates a partially illuminated portion of the indicator 22. In FIG. 3, light guides 24 including numerals 1, 2 and 3 that are illuminated to indicate an engine RPM of approximately 3000. As appreciated, each of the light guides 24 is selectively and individually illuminated such the vehicle operating parameter, engine RPM in this example, is communicated to the vehicle operator.

Referring to FIGS. 4 and 5, the example indicator 22 includes light bars 24 that are each individually mounted to the housing 32 of the main gauge 14. Each of the light guides 24 is mounted either with a threaded fastener 40 or an adhesive 42. In the illustrated example, both an adhesive 42 and fastener 40 are utilized. As appreciated, each of the light guides 24 is individually mounted to the housing 32 such that each comprises a separate portion of the entire indicator 22. Although the illustrated example includes both a fastener and an adhesive 42 either or both may be utilized. Moreover, other fastening means for securing each of the light bars 24 to the housing 32 may also be utilized. Further, although the example light guides 24 are disclosed as being attached directly to the housing 32 other support structures present with the vehicle or dashboard 10 may also support the individual light guards 24 proximate to the housing 32 are also within the contemplation of this invention.

A light source 34 is disposed proximate to each of a corresponding light guides 24. In this example, the light source 34 comprises a light emitting diode (LED). Each of the LEDs 34 are electrically connected and controlled by a controller 38. The example controller 38 is illustrated schematically as disposed within the housing 32 of the main gauge 14. As appreciated, the controller 38 may be part of the instrument cluster within the main housing 32. However, the controller 38 may also be part of the overall vehicle controller. In any instance wherever the controller 38 is mounted it is utilized to receive information indicative of the desired vehicle operating parameter and command selective illumination of a corresponding one of the LEDs 34.

Each of the LEDs 34 are mounted proximate to a light receiving surface 44 of the corresponding light guide 24. In the disclosed example the LEDs 34 are mounted to a printed circuit board 36, that is in turn mounted to the housing 32 and/or main gauge 14. It should be understood, that the LEDs 34 could also be mounted separately to the light guide 23. Light emitted from the LED 34 enters the light guide 24 through the light receiving surface 44 and travels towards a distill end 52 of each of the light guides 24. Light traveling through the light guide 24 proceeds uninterrupted until reaching the imperfections provided by the etched surface 30. The etched surface is a portion of the light guide 24 where the surface is textured to create a reflective surface that gathers light emitted through the light guide 24. In this way, light projected by the LED 34 through the light receiving surface 44 will extend and be transmitted through the light guide 24 virtually undetected by the vehicle operator. Light within the non-etched areas of the light guide 24 is not highly visible and therefore aids in the creation of the desired visual appearance that the numerals are floating a distance away from the outer periphery 35 of the housing 32.

In this example the light guide 24 includes a tapered cross-sectional configuration. A first width 48 disposed at or near the light source 34 is at a greatest width. A second width 50 disposed near the tip 52 at an end opposite the light receiving surface 44 is much thinner. This tapered configuration provides for light to be gathered toward the tip 52 in the spaced apart relationship at the etched surface 30.

Referring to FIG. 6 with continued reference to FIGS. 4 and 5, the example light guide includes the tapered configuration from the light-receiving surface 44 towards the tip 52. The tapered surface aids in communicating the light to the etched surface 30 to provide the desired visual appearance. As appreciated, the desired visual appearance is to create the appearance that the numerals are floating in a spaced apart relationship to the gauge 14.

The etched surface 30 creates imperfections that gather light on the surface in the form of the example numbers and symbols. In order to maintain the selective and individual illumination, a light housing 54 separates each of the light guides 24. The light housing 54 provides for the separation of light between the different light guides of the indicator 22. The example light housing 54 surrounds the light sources 34 such that light is directed only through the light-receiving surface 44 of each of the corresponding light guides. Light from one light source is prevented from spilling into an adjacent light guide 24 by these light housings 54.

Referring to FIG. 7 another embodiment of example indicator assembly 60 includes a light guide 62 that is formed from a single piece of material. The light guide 62 includes separate channels 64 that are separated by walls 66. The walls 66 prevent the intrusion of light from one channel 64 into an adjacent channel 64. The one-piece light guide provides another configuration that can generate the desired aesthetic appearance of the data presented.

In the illustrated examples, each of the light guides 24 are comprised of a clear, acrylic material that allows for the transportation and guiding of light from the light sources 34 mounted to the outer housing 32 of the main gauge 14. As appreciated, although acrylic is utilized other clear materials that provide the same transparent and light communication properties could also be utilized. Moreover, in this example, the light sources 24 emit a white light to provide a white color for each of the etched areas. The turn indicators 28 and 26 include a green light source that provide the desired green illumination of the symbols indicating right or left turn. As appreciated, the light sources 34 could be of any color desired and may also provide for the option of multicolored or changing of colors throughout the color spectrum. In such an embodiment, each of the LED light sources 34 would comprise an array of red, green and blue LEDs. Each of the separate light sources then could be controlled by the controller 38 to provide any color as desired for illumination of the corresponding numerals.

The disclosed example light indicator allows for the creation of the visual appearance of numerals being illuminated spaced apart and disconnected from the main gauge 14. The desired floating appearance provides a different means and method of communicating information to a vehicle operator.

Although an example embodiment has been disclosed, a worker of ordinary skill in this art would recognize that certain modifications would come within the scope of this disclosure. For that reason, the following claims should be studied to determine the scope and content of this invention.

What is claimed is:
1. An information display device comprising:
a gauge defining an outer periphery; and
at least one cantilevered light guide extending from the outer periphery, wherein the at least one light guide is illuminable for communicating information indicative of vehicle operation.

2. The information display device as recited in claim 1, wherein the at least one cantilevered light guide includes an indicator spaced apart from the outer periphery of the gauge.

3. The information display device as recited in claim 2, wherein the indicator comprises a number formed in a visible surface of the cantilevered light guide.

4. The information display device as recited in claim 2, wherein the indicator comprises a textured surface different than the surrounding surface for reflecting light emitted through the cantilevered light guide.

5. The information display device as recited in claim 1, wherein the at least one cantilevered light guide comprises a plurality of separate cantilevered light guides.

6. The information display device as recited in claim 5, including a corresponding plurality of light emitting devices mounted at a first end of a corresponding one of the plurality of cantilevered light guides.

7. The information display device as recited in claim 6, wherein the first end comprises a light-receiving surface disposed normal to the corresponding one of the light emitting devices.

8. The information display device as recited in claim 1, wherein the cantilevered light guide is mounted to a rear surface of the at least one gauge.

9. An instrument panel for a vehicle comprising:
a main gauge defining a display area for communicating information indicative of vehicle operation; and
a plurality of cantilevered light guides mounted to and extending from the main gauge, wherein the plurality of light guides combine to communicate a value for an operating parameter of a vehicle.

10. The instrument panel as recited in claim 9, wherein the main gauge includes an outer periphery, and the plurality of cantilevered light guides extend outward from the outer periphery.

11. The instrument panel as recited in claim 9, wherein each of the plurality of cantilevered light guides are individually illuminable.

12. The instrument panel as recited in claim 10, wherein each of the plurality of cantilevered light guides comprises an increment of the operating parameter.

13. The instrument panel as recited in claim 11, wherein each of the plurality of cantilevered light guides comprises an increment of engine rpm.

14. The instrument panel as recited in claim 9, wherein at least one of the plurality of cantilevered light guides comprises a turn signal indicator.

15. The instrument panel as recited in claim 9, wherein the plurality of cantilevered light guides comprise a clear material transmitting light received through a light-receiving surface.

16. The instrument panel as recited in claim 15, wherein each of the cantilevered light guides comprises an acrylic material.

17. The instrument panel as recited in claim 15, including a corresponding plurality of light emitting devices mounted to the main gauge for transmitting light through a corresponding light receiving surface.

18. A method of communicating a vehicle operating parameter comprising:
mounting a plurality of light transmitting cantilevered light guides to a fixed structure;
mounting a corresponding plurality of light emitting devices proximate a corresponding cantilevered light guide;
generating a representation of a value of a vehicle operating parameter on a visible surface of at least some of the light transmitting cantilevered light guides; and
selectively lighting corresponding ones of the cantilevered light guides indicative of a current vehicle operating parameter.

19. The method as recited in claim 18, including mounting a first end of each of the plurality of cantilevered light guides to the fixed structure such that a second end opposite the first end is spaced a distance apart from the fixed structure.

20. The method as recited in claim 19, including mounting the plurality of cantilevered light guides to a fixed structure that comprises a portion of a main gauge.

* * * * *